6533X
R Meriam,
Card-Setting Machine.
Patented May 2, 1831.
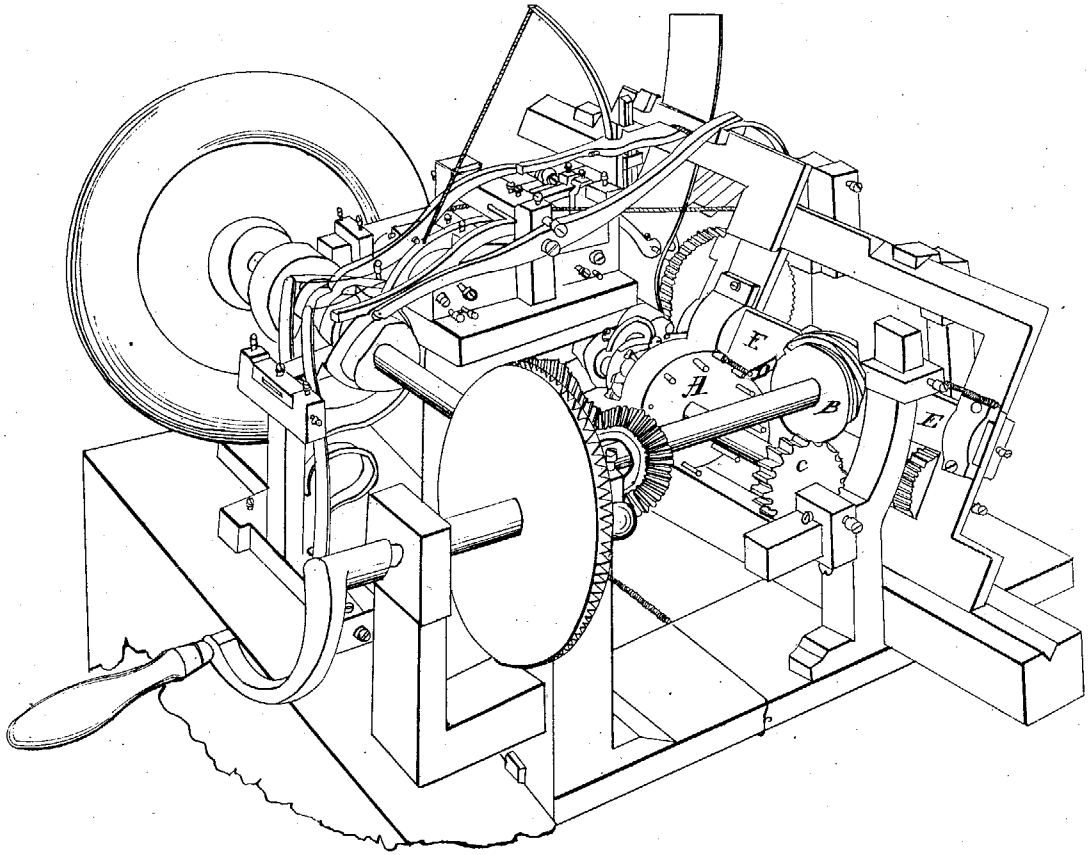
N. PETERS, PHOTO-LITHOGRAPHER, WASHINGTON, D. C.

May. 2. 1831 149.

6533X

Reuben Meriam, of Leicester State of Massachusetts,

Letters Patent,

The schedule referred to in these Letters Patent and making part of the same containing a description in the words of the said Reuben Meriam himself of his improvement in the "Cut, Prick, and Set machine"

To all persons to whom these presents shall come Be it known that I Reuben Meriam of Leicester in the County of Worcester and Commonwealth of Massachusetts, have invented a new & useful improvement in the machine for manufacturing filletting Cards used on Carding Machines known by the name of "Cut, Prick, & Set Machine". The machine on which my improvement is made, was formerly patented by Amos Whittemore. The following is a full and exact description as far as the case will allow, of the improvement of said Whittemore's machine which I claim to have invented The improvement consists in effecting the side motion of the carriage which holds the leather in a more gentle & perfect manner, so that the operation may be greatly accelerated and the machine at the same time less liable to get out of order This is done by a wheel of suitable size, firmly attached to a horizontal arbor which turns on pivot centres, passing through the centre of the wheel, which wheel in the annexed drawing is marked A, through this wheel and near its circumference, pins are inserted at equal distances, which are in number equal to double the number of rows of teeth in the fillething, These pins are of unequal length, The first pin barely passes through the wheel, the second passes through as much more as it is necessary for the leather to be moved side ways in order to receive the next tooth. The pins continue to to lengthen in the same proportion half round the wheel, and then are shortened in the same proportion on the other half of the wheel to the pin first mentioned, except that there are two long pins of the same length, standing together, and two short pins of the same length standing together, at the longest and shortest ends The abovementioned wheel is put in motion by another wheel marked B. in the annexed drawing which is firmly attached to an arbor turning with equal speed with the main arbor of the machine, on the outer edge or circumference of the last mentioned wheel are a suitable number of teeth placed in the form and operating in the manner of an endless screw, which take hold of the cog wheel, marked C, in the drawing, which cog wheel is attached to the arbor passing through the wheel A, These teeth pass about half round the wheel in the annexed drawing, on the other half of the circumference of the wheel is a groove, which holds the wheel A in its proper place while the card tooth is inserted, The ends of the pins inserted in the wheel marked A pass against a plain placed perpendicularly nearly in the form of a segment of a circle, which is marked in the annexed drawing D, in the centre of this plain the operating pin becomes stationary when it is necessary for the carriage to be so, the upper part only of the plain appears in the drawing, the plain is kept close to the pins, by a spring or weight suspended by a cord fastened to the carriage and passing over a loose pulley, Thus by half the revolution of the wheel A the teeth are set once across the card from left to right, and by the other half of the revolution, another row of teeth is set from right to left, The plain is attached to a slide in the carriage marked E in the drawing it is flat and moveable endwise a short distance, On the backside of the slide not seen in the drawing is a small wheel attached to an arbor and turned in centres firmly attached to the carriage, through which wheel are inserted a sufficient number of small pins the

5/2/1831 6533X 1145 the ends of which are made to pass, against another plain attached to the slide, This last mentioned wheel is put in motion by two knobs on opposite sides of the wheel A and the operation of its screw pins against its plain, moves the plain D. sideways, so as to effect at will in the card,

What I claim as this above specified principle of moving the carriage. The other parts of my machine are not materially different from Whittemore's, The Carriage of his Machine and of all others, known to me, are moved by hands, alternately sitting into a racks.

The motion of the Carriage may also be effected by two plains: one placed on each side of the wheel A and half of the pins reversed, so that one half shall pass against one plain and the other half against the other plain alternately in this case, the [illegible] half of the above described plain only would be necessary, and springs must be made to operate alternately so as to keep the plains close to the pins. This last mentioned improvement I also claim as my own invention, and have it in contemplation to apply the same to the said Machine Witnesses
John Sargent
Lyman Waster Reuben. Meriam Ex? C.H.W.

[illegible] [illegible]